United States Patent

Kawaguti

[11] Patent Number: 5,876,090
[45] Date of Patent: Mar. 2, 1999

[54] FLOOR COVERING ASSEMBLY

[75] Inventor: Fernando Kawaguti, Northville, Mich.

[73] Assignee: Lear Corporation, Southfield, Mich.

[21] Appl. No.: 863,969

[22] Filed: May 27, 1997

[51] Int. Cl.$^6$ .................................................. B62D 25/00
[52] U.S. Cl. ...................................... 296/208; 296/97.23
[58] Field of Search ................................... 296/191, 185, 296/193, 208, 39.1, 39.3, 97.23

[56] References Cited

U.S. PATENT DOCUMENTS

| | | | |
|---|---|---|---|
| 3,494,657 | 2/1970 | Tantlinger et al. | ...................... 296/208 |
| 3,603,048 | 9/1971 | Hadfield . | |
| 3,715,844 | 2/1973 | Breading . | |
| 4,656,798 | 4/1987 | Hazen . | |
| 4,673,207 | 6/1987 | Reynolds et al. . | |
| 5,008,491 | 4/1991 | Bowman . | |
| 5,178,434 | 1/1993 | Krebs | ............................... 296/97.23 X |
| 5,193,879 | 3/1993 | Chen | ..................................... 296/208 X |
| 5,345,736 | 9/1994 | Shoenfeld . | |
| 5,573,294 | 11/1996 | Mack | ..................................... 296/97.23 |

*Primary Examiner*—Joseph D. Pape
*Attorney, Agent, or Firm*—Brooks & Kushman P.C.

[57] ABSTRACT

A floor covering assembly for covering the floor pan area of a vehicle in which the floor pan area includes a recess for routing an operating component, such as a wire harness, for the vehicle. The assembly includes an aesthetic material, a padding material, and a shield. The aesthetic material, such as a carpet, is adapted to be coextensive with the floor pan area to cover the floor pan area and the recess. The padding material has one side attached to the aesthetic material and is substantially coextensive therewith. The shield protects the operating component and is selectively attached to the other side of the padding material at a predetermined location smaller than the floor pan area, whereby to cover the recess in the floor pan area protectively when the assembly is installed in the vehicle to cover the floor pan aesthetically.

6 Claims, 1 Drawing Sheet

FLOOR COVERING ASSEMBLY

TECHNICAL FIELD

This invention relates to an assembly for covering the floor pan area of a vehicle.

BACKGROUND ART

For many years vehicle floors have been covered with an aesthetic material such as carpet. Often, the carpet includes padding material positioned between the pile of the carpet and the floor pan over which the carpet is laid. Typically, a single piece of carpet and a single pad cover the entire interior passenger compartment of the vehicle. The floor pan may have one or more recesses or channels for routing operating components, such as hydraulic brake lines or wire harnesses. These operating components require protection from the surrounding environment by shielding the recess. For example, a wire harness routed in a floor pan recess requires electrical isolation and crush protection.

It is common practice to protect the portion of a wire harness routed in a floor pan recess with a living hinged plastic sleeve or shield substantially conforming to the cross-section of the recess. During assembly of the vehicle, an open shield is installed in a recess, a wire harness is routed inside the shield, and the shield is snapped closed. Carpet and pad is then installed over top of the floor pan and shield. While this shielding method protects the wire harness, it nevertheless has several shortcomings including high labor and material cost.

SUMMARY OF THE INVENTION

The present invention is a floor covering assembly installable for covering the coverable floor pan area of a vehicle in which the floor pan area includes a recess for routing an operating component for the vehicle. The assembly comprises aesthetic material, padding material, and a shield. The aesthetic material is adapted to be sufficiently coextensive with the floor pan area to cover the floor pan area and the recess. The padding material has a first side attached to the aesthetic material and is substantially coextensive therewith. The shield is protectively compatible with the operating component and selectively attached to a second side of the padding material at a predetermined location smaller than the floor pan area, whereby to cover the recess in the floor pan area protectively when the assembly is installed in the vehicle to cover the floor pan aesthetically.

Accordingly, an object of the present invention is to provide an improved floor covering assembly for a vehicle which reduces labor cost.

Another object of the present invention is to provide an improved floor covering assembly for a vehicle which reduces material cost.

Still another object of the present invention is to provide an improved floor covering assembly for a vehicle which replaces a multiple component assembly with a unitary assembly to reduce complexity and assembly time.

The above objects and other objects, features, and advantages of the present invention will be readily apparent from the following detailed description of the best mode for carrying out the invention when taken in conjunction with the accompanying drawings.

DETAILED DESCRIPTION OF THE PREFERRED EMBODIMENT

Figure 1:
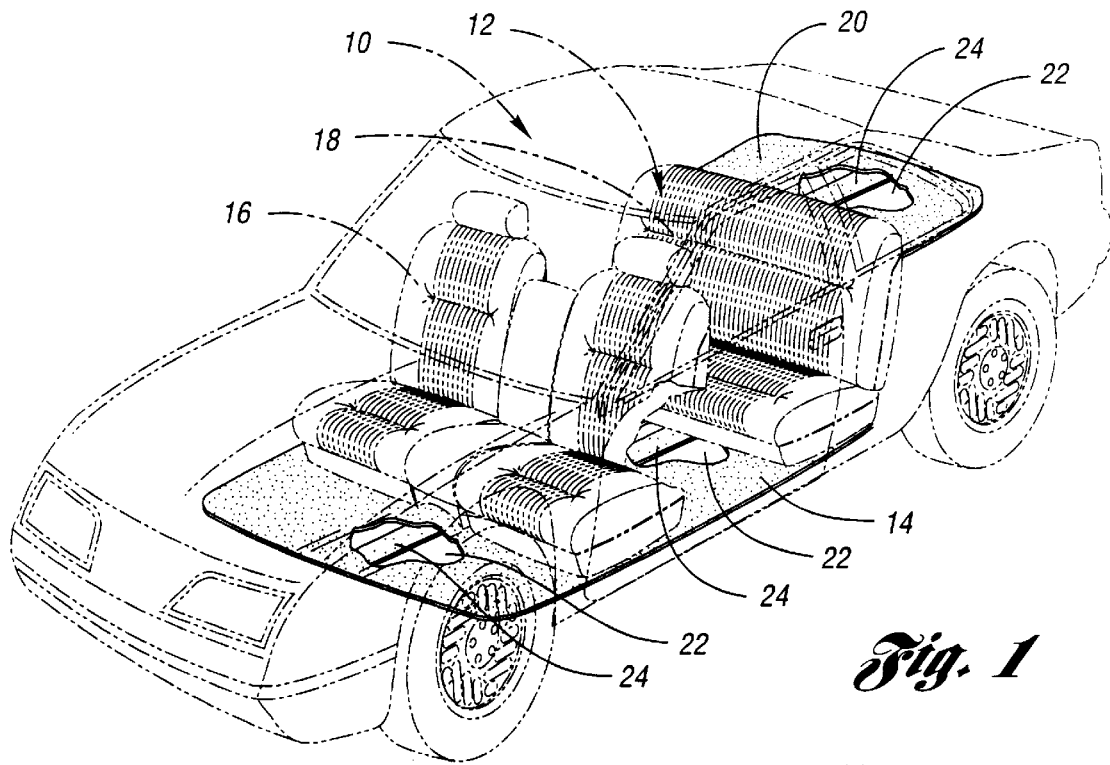
FIG. 1 is a perspective view, partly in phantom, of a motor vehicle showing an interior floor pan having a floor covering assembly in accordance with the present invention.

FIG. 1 shows a vehicle 10 in phantom lines having an interior space 12 including a floor covering assembly 14 in accordance with the present invention. Portions of the floor covering assembly 14 located in the front seat area 16, rear seat area 18, and trunk area 20 are broken away to show a floor pan 22 coextensive with the interior space in each area to define a flooring for the interior. A shield 24 is also provided overlaying a recess or channel 26 in the floor pan 22. Shield 24 is used to protect operating components routed in the recess 26 within the floor pan 22.

Figure 2:
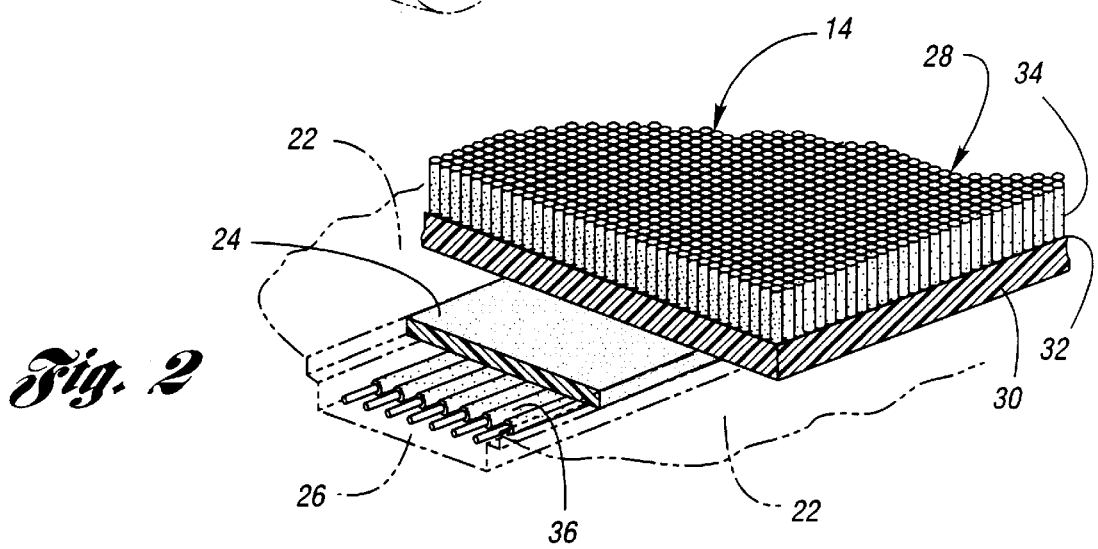
FIG. 2 is a fragmentary perspective view of the interior floor pan of FIG. 1 with portions of the floor covering assembly broken away to show a recess in the floor pan containing a wire harness.

FIG. 2 shows a piece of the floor covering assembly 14 of FIG. 1 covering floor pan 22 and recess 26. Floor covering assembly 14 comprises an aesthetic material 28, a padding material 30 and shield 24. Aesthetic material 28 may be carpeting having a backing 32 and pile 34. It should be understood that other floor coverings such as plastic or vinyl may also be used in the present invention. The color of aesthetic material 28 may be coordinated to match or harmonize with other interior cloth and trim pieces. Padding material 30 is located between aesthetic material 28 and shield 24. Aesthetic material 28 is adapted to be sufficiently coextensive with the floor pan area to cover the floor pan area 22 and the recess 26. Padding material 30 is substantially coextensive with the aesthetic material 28 and thus also covers the floor pan area 22. Shield 24 covers recess 26.

Operating components, such as hydraulic brake lines or wire harnesses, may be routed within recess 26. Accordingly, shield 24 is protectively compatible with the operating component which is routed in recess 26. FIG. 2 shows a wire harness 36 routed within recess 26. Although only one recess 26 is shown in floor pan 22, it is contemplated that a vehicle may have several recesses in its floor pan and that several different operating components may be routed within the recesses. It is further contemplated that the floor pan of a vehicle may be covered with a single piece of floor covering assembly or multiple pieces to respectively cover separate floor pan areas.

Figure 3:
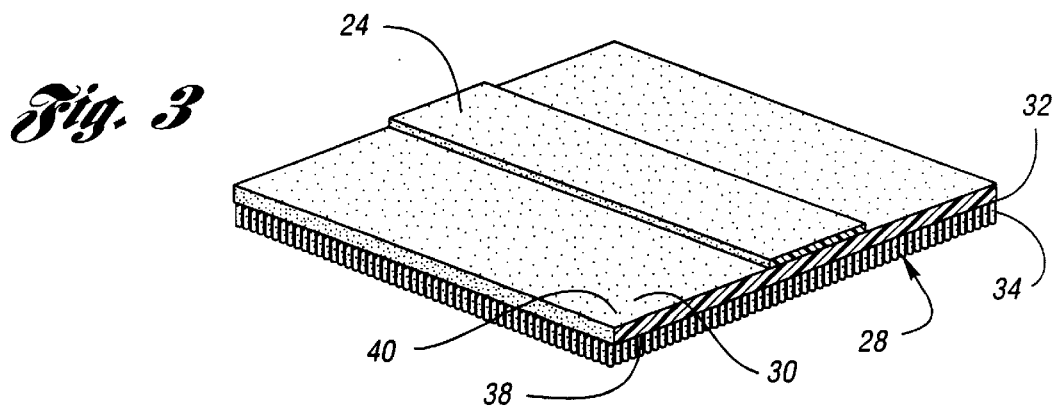
FIG. 3 is a perspective view of a piece of the floor covering assembly of FIG. 1 inverted to show the parts of the assembly.

FIG. 3 shows a piece of floor covering assembly 14 from FIG. 1 in an inverted position. As discussed above, the aesthetic material 28 may be a carpeting having a pile 34 and a rubber backing 32. A heated mold process may be used to attach a first side 38 of the padding material 30 to the rubber backing 32 of aesthetic material 28. In this process, padding material 30 and aesthetic material 28 are to be placed in a mold. When the mold is heated, rubber backing 32 melts and bonds padding material 30 to aesthetic material 28.

Padding material 30 may be a moldable, needled reclaimed fiber padding of uniform construction. In particularly, the padding material 30 advantageously comprises a homogenous mixture of synthetic and natural fibers needled in a random orientation. The second side 40 of padding material 30 may include rib formations matching the horizontal surface of floor pan 22 and, thereby, provides the aesthetic material 28 of the floor covering assembly 14 with a smooth top surface. Furthermore, the rib formations may be used to properly align floor covering assembly 14 with respect to floor pan 22 during assembly. Push pins may be used to secure floor covering assembly 14 to floor pan 22. The pins may be pushed through floor covering assembly 14 at predetermined locations and into holes in floor pan 22.

Shield 24 is preferably attached with a pressure sensitive adhesive to a second side 40 of padding material 30. Shield 24 is smaller in area than padding material 30 and is thus attached at a predetermined location on padding material 30 so that shield 24 covers recess 26 when floor covering assembly 14 is installed right-side-up in vehicle 10 to aesthetically cover floor pan 22. The location for shield 24 may be determined through the use of computer-aided drafting (CAD) techniques. The rib formations in padding material 30 and/or push pin locations may be used as reference points to determine the proper location of shield 24 with respect to padding material 30.

In general, the material for shield 24 should be compatible with the operating components in the recess, e.g. hydraulic brake lines and/or electrical wire harnesses. More particularly, shield 24 may comprise an extruded grade of wood fiber filled polypropylene made from a vacuum or match metal die mold. In a preferred embodiment, the composition of shield 24 is primarily wood fiber and polypropylene with a talc filler and a small amount of polyethylene.

As a unitary piece of floor covering and shield, the present invention eliminates the plastic sleeve or shield required in the prior art. Similarly, the prior art assembly steps of installing an open shield in a recess, routing an operating component within the shield, snapping the shield closed, and laying carpet and pad over the floor pan of the vehicle are condensed. The present invention allows an assembler to simply route the operating component within the recess and secure the present invention over top of the floor pan. Thus, the present invention reduces material cost, labor cost, part complexity, and assembly time over the prior art.

It is to be understood, of course, that while the forms of the invention described above constitute the best mode contemplated of practicing the present invention, the preceding description is not intended to illustrate all possible forms thereof. It is also to be understood that the words used are words of description,rather than of limitation, and that various changes may be made without departing from the spirit and scope of the present invention, which should be construed according to the following claims.

I claim:

1. A floor covering assembly installable for covering a coverable floor pan area of a vehicle in which the floor pan area includes a recess for routing an electrical wire harness for the motor vehicle, the assembly comprising:

aesthetic material adapted to be sufficiently coextensive with the floor pan area to cover the floor pan area and the recess;

padding material having a first side attached to the aesthetic material and substantially coextensive therewith; and a shield protectively compatible with the wire harness and selectively attached to a second side of said padding material at a predetermined location smaller than the floor pan area, whereby to cover the recess in the floor pan area protectively when the assembly is installed in the vehicle to cover the floor pan aesthetically.

2. The floor covering assembly of claim 1 wherein the aesthetic material comprises a carpet.

3. The floor covering assembly of claim 1 wherein the padding material is attached to the aesthetic material with an adhesive.

4. The floor covering assembly of claim 1 wherein the shield is attached to the padding material with an adhesive.

5. The floor covering assembly of claim 1 wherein the wire shield is comprised of a wood fiber and a polypropylene with a talc filler.

6. A floor covering assembly installable for covering a coverable floor pan area of a vehicle in which the floor pan area includes at least one recess for routing a wire harness for the motor vehicle, the assembly comprising:

aesthetic material adapted to be sufficiently coextensive with the floor pan area to cover the floor pan area and the recess;

padding material having a first side attached to the aesthetic material and substantially coextensive therewith; and at least one shield protectively compatible with the wire harness and selectively attached to a second side of said padding material at a predetermined location smaller than the floor pan area, whereby to cover the at least one recess in the floor pan area protectively when the assembly is installed in the vehicle to cover the floor pan aesthetically.

\* \* \* \* \*